May 30, 1961 M. L. LINDENBERG 2,986,020
EVAPORATOR FOR ICE-CUBE MAKING MACHINES
Filed Nov. 25, 1959
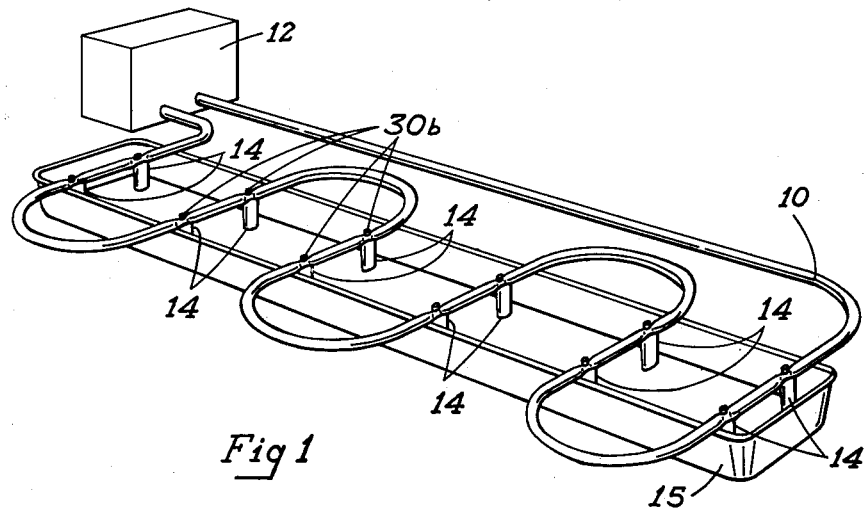
Fig 1
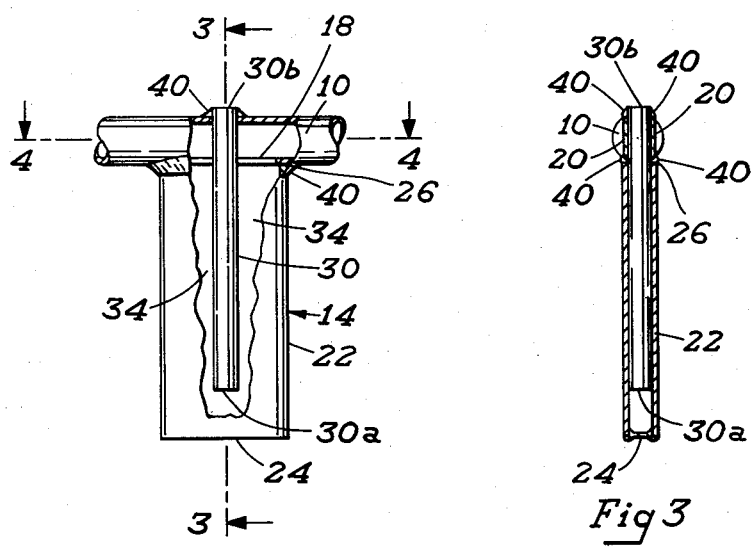
Fig 2
Fig 3
Fig 4
INVENTOR.
MILTON L. LINDENBERG
BY
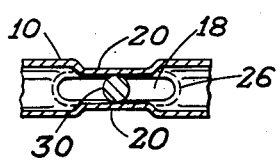
ATTORNEY

United States Patent Office 2,986,020
Patented May 30, 1961

2,986,020

EVAPORATOR FOR ICE-CUBE MAKING MACHINES

Milton L. Lindenberg, 1129 Moore, Beloit, Wis.

Filed Nov. 25, 1959, Ser. No. 855,443

5 Claims. (Cl. 62—515)

This inventon relates generally to an evaporator for a refrigeration system for making ice cubes.

It is an object of this invention to provide such an evaporator which is highly efficient while being of relatively simple construction and inexpensive to manufacture.

It is an other object to provide such an evaporator having a plurality of spaced apart freezing elements connected in series by a refrigerant carrying conduit.

It is a more specific object to provide an evaporator in which the freezing elements depend from and are supported by the evaporator conduit.

It is another object to provide an evaporator having a hollow, elongated, thin walled freezing element reinforced by a solid divider stem which divides the element into a pair of passages intercommunicating at one end of the stem and which forms a mounting stem at the other end passing through openings provided in the conduit to rigidly connect the element thereto.

It is also a specific object to provide such an evaporator in which the divider stem divides not only the freezing stem into two passages but also forms a partition in the conduit which causes the refrigerant to flow successively through said passages and return to the conduit on the other side of said stem.

It is also a specific object to provide such an evaporator in which the conduit communicates with one of the pair of passages in the freezing element on each side of the divider stem and having the walls of the conduit indented against the portion of the divider stem passing therethrough to form an obstruction in the conduit directing the flow of refrigerant from the conduit into the freezing element on one side of the stem and from the freezing element back into the conduit on the other side of the stem.

It is an additional object to provide such an evaporator in which the freezing element has a transverse cross section elongated in the direction of the conduit axis to provide a freezing element surface having a large outer surface area relative to the volume of refrigerant flowing therethrough.

These and other objects of this invention will more fully appear from the following description made in connection with the accompanying drawings wherein like reference characters refer to the same or similar parts throughout the several views, and in which:

Fig. 1 is a perspective view of an evaporator showing the freezing elements depending from the conduit into the freezing tray of an ice making machine;

Fig. 2 is a side view of a freezing element and a portion of the conduit partly broken away to show the relationship of the divider stem thereto;

Fig. 3 is a central vertical section of the conduit and freezing element taken along the line 3—3 in Fig. 2 and showing the divider stem in elevation; and, Fig. 4 is a horizontal section taken along the line 4—4 in Fig. 2 showing the outer surface of the freezing element by a broken line.

In the form of the invention shown in the accompanying drawing an evaporator conduit 10 as best shown in Fig. 1 is provided having the respective ends thereof connected to a conventional freezer compressor 12 for pumping a refrigerant therethrough and including a conventional condenser receiver and expansion element. In the form of the ivention shown, the evaporator conduit 10 consists of a cylindrical copper tube coiled upon a horizontal plane and having a plurality of freezing elements 14 attached thereto in series in a pair of rows and adapted to extend downwardly into the freezer tray 15 of an ice cube making machine.

A circular opening is formed through the upper portion of the conduit 10 above each freezing element 14 of a size substantially smaller in diameter than the inside diameter of the conduit 10. An elongated opening 18 is formed through the opposite side of the conduit 10 of the same general width as the diameter of the upper opening and elongated parallel to the axis of the conduit as best shown in Figs. 2 and 4. The walls 20 of the conduit 10 adjacent to said openings are indented respectively to define a vertical passage through the conduit generally equal in width to the diameter of the upper opening and the width of the lower opening 18. The conduit 10 has a generally uniform diameter except at said indentations.

The freezing elements 14 are composed of a thin-walled, hollow, elongated freezing jacket 22 having a closed end 24 and an open end 26. The open end 26 of the jacket 22 is of slightly larger dimensions than the opening 18 in the bottom of the conduit 10. An elongated divider stem 30 is axilaly inserted into the jacket 22. The divider stem 30 in the form shown consists in a rod-like solid member of a diameter to tightly engage opposite sides of the jacket 22 and divide the same into a pair of passages 34 respectively extending longitudinally through the jacket 22 on each side of the divider stem 30. The lower end 30a of the stem 30 is spaced apart from the closed end 24 of the jacket 22 to provide a communication between the passages 34 at the closed end 24 of the jacket 22. The upper end of the divider stem 30 extends outwardly beyond the open end 26 of the jacket 22 a distance slightly greater than the diameter of conduit 10 to form a mounting extension 30b. The rod-like divider stem 30 is of generally the same diameter as the vertical passage through the conduit 10 formed by the indentation of the side walls 20.

The upper end 30b of the divider stem 30 is inserted upwardly through the aligned openings in the conduit 10 to position the open end 26 of the jacket 22 in abutment with the portion of the conduit 10 surrounding the opening 18 therein. An appropriate sealing means such as the solder 40 is applied to the line of contact between the upper end 26 of the jacket and the portion of the conduit 10 abutted thereby, and sealing means 40 is also applied to the junction of the upper end 30a of the divider stem 30 and the portion of the conduit 10 surrounding the circular opening in the upper surface of the conduit to prevent the escape of refrigerant and also to integrally unite the stem 30 and the jacket 26 to the conduit 10 so that the jacket 22 will be supported by the conduit 10.

A refrigerant flowing through the conduit 10 is directed downwardly through one side of the opening 18 into one of the longitudinal passages 34 in the jacket 22 by the divider stem 30 which obstructs the flow thereof across the top of the jacket 22. The refrigerant then flows below the divider stem 30 at the closed end of the jacket 22 and upwardly through the passage 34 disposed on the other side of the divider stem 30 and then out through the other side of the opening 18 and back into the conduit 10. As shown in Fig. 1, freezing elements 14 are mounted in series upon the refrigerant conduit 10 and therefore all of the refrigerant which passes through the conduit 10 also passes through each of the freezer jackets 22, which in the form shown, during the freezing operation extend downwardly into the freezer tray containing liquid to be frozen into cubes. The liquid to be frozen forms into ice cubes upon each of the freezer jackets 22, and when cubes of desired size are formed, they may be removed from the freezing elements by any convenient method, such as introducing hot gas from the compressor 12 into the conduit 10.

As best shown in Fig. 4, the freezing jacket 22 is substantially elongated in one direction in transverse cross section so that a large freezing surface area is provided relative to the volume of refrigerant within the jacket. The refrigerant therefore is maintained in closely spaced relation to the freezing surface and highly efficient use is made of the refrigerant to make ice cubes of large size in a relatively short period of time.

It will, of course, be understood that various changes may be made in the form, details, arrangement and proportions of the parts without departing from the scope of my invention which consists of the matter shown and described herein and set forth in the appended claims.

What is claimed is:

1. A freezing unit for a refrigeration system comprising an evaporator conduit for carrying a refrigerant, a hollow elongated freezing element jacket closed at one end and open at the other end, an elongated divider stem substantially smaller in diameter than the inside diameter of said conduit axially inserted into said jacket to divide the same into two passages but terminating in spaced relation to the closed end of the jacket to permit communication between said passages at the closed end of said freezing element, the other end of said stem extending outwardly beyond the open end of said element to provide a mounting extension, said conduit having a passage transversely therethrough of a slightly larger diameter than said divider stem, said mounting stem being inserted through said transverse passage and the side walls of said conduit being indented into sealed engagement with said stem to combine therewith and form a positive obstruction in said conduit, the two passages formed in said jacket communicating with the interior of said conduit respectively on each side of said obstruction, to thereby cause the refrigerant carried by said conduit to flow through the passages, and said conduit being generally uniform in diameter except said indented portions thereof.

2. The structure set forth in claim 1 and said divider stem comprising a solid, rod-like member to reinforce the thin walls of said jacket and providing a reinforcing attachment member rigidly connecting said jacket to said conduit.

3. The structure set forth in claim 2 and means sealingly uniting said mounting extension and the open end of said jacket to said conduit to form a continuous sealed passage through said conduit and jacket and to maintain said jacket in fixed supported relation to said conduit.

4. The structure set forth in claim 3 and said jacket being substantially elongated in transverse cross section to provide a freezing element having a relatively large freezing surface in proportion to the area of said cross section and whereby all refrigerant flowing through said jacket maintains closely spaced refrigerating association with the freezing surface of the freezing element jacket.

5. A freezer apparatus for use in ice cube making machines comprising a conduit for carrying a refrigerant and having a plurality of pairs of transversely aligned spaced apart openings therethrough, one of said openings of each pair being elongated upon an axis parallel to the axis of said conduit, a plurality of freezing element jackets having a closed end and an open end, the open end of each of said jackets being positioned to respectively engage the portions of the conduit surrounding each of said elongated openings, a stem member extending through substantially the full length of the central portion of each jacket but terminating in spaced relation to the closed end thereof, the walls of said conduit adjacent to said aligned openings being indented to sealingly engage the sides of said stem so that said stem obstructs the flow of refrigerant through said conduit, other portions of said conduit having a generally uniform diameter, opposite sides of said jacket abutting respectively opposite sides of said stem whereby refrigerant flowing through said conduit is directed through first one side of said jacket on one side of said stem, across the closed end of said jacket around the spaced end of said stem, and back into said conduit through the other side of the jacket and said stem.

References Cited in the file of this patent

UNITED STATES PATENTS

| | | |
|---|---|---|
| 2,364,279 | Dodge | Dec. 5, 1944 |
| 2,709,344 | Grow | May 31, 1955 |